United States Patent Office  2,882,406
Patented Apr. 14, 1959

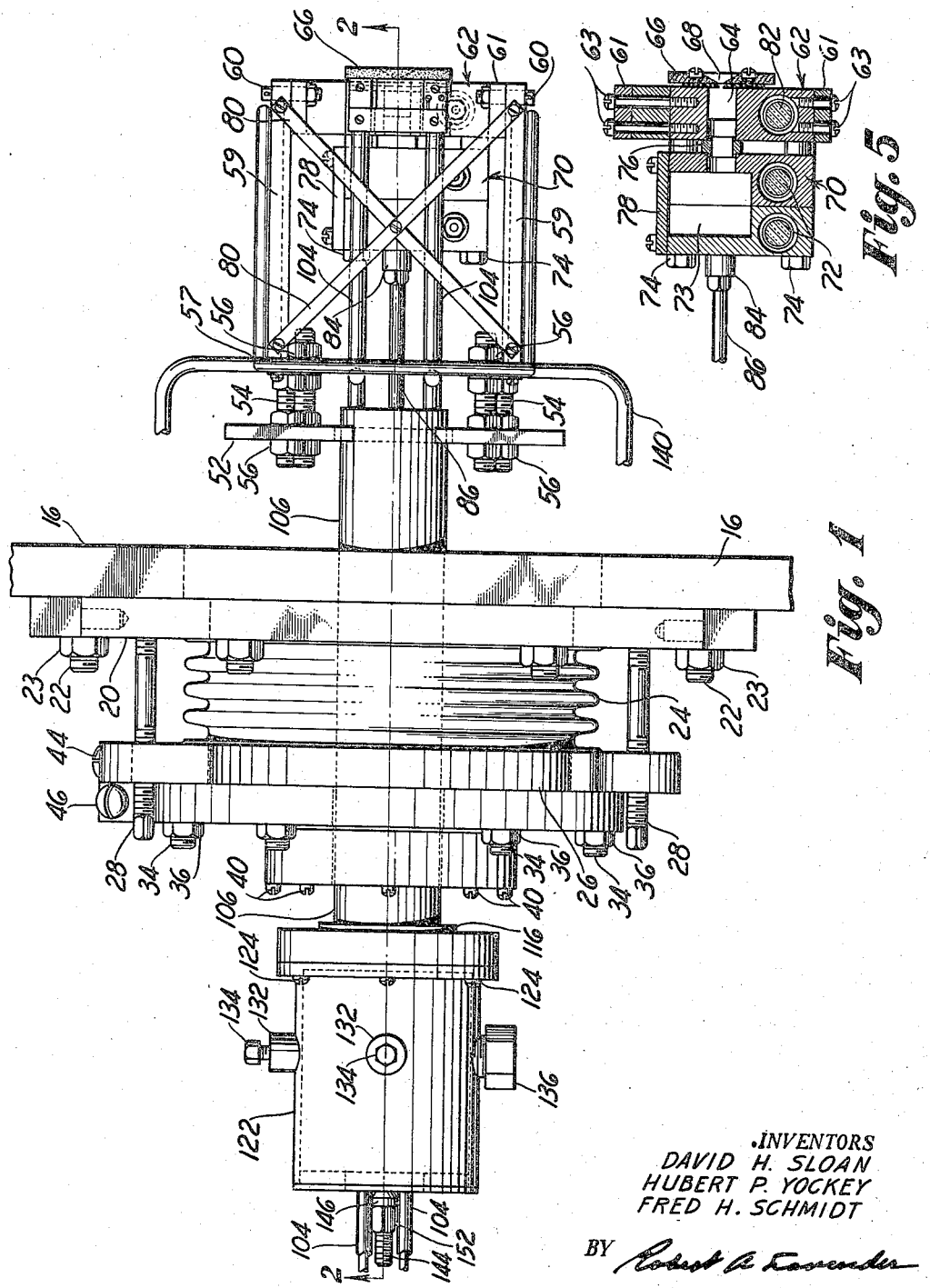

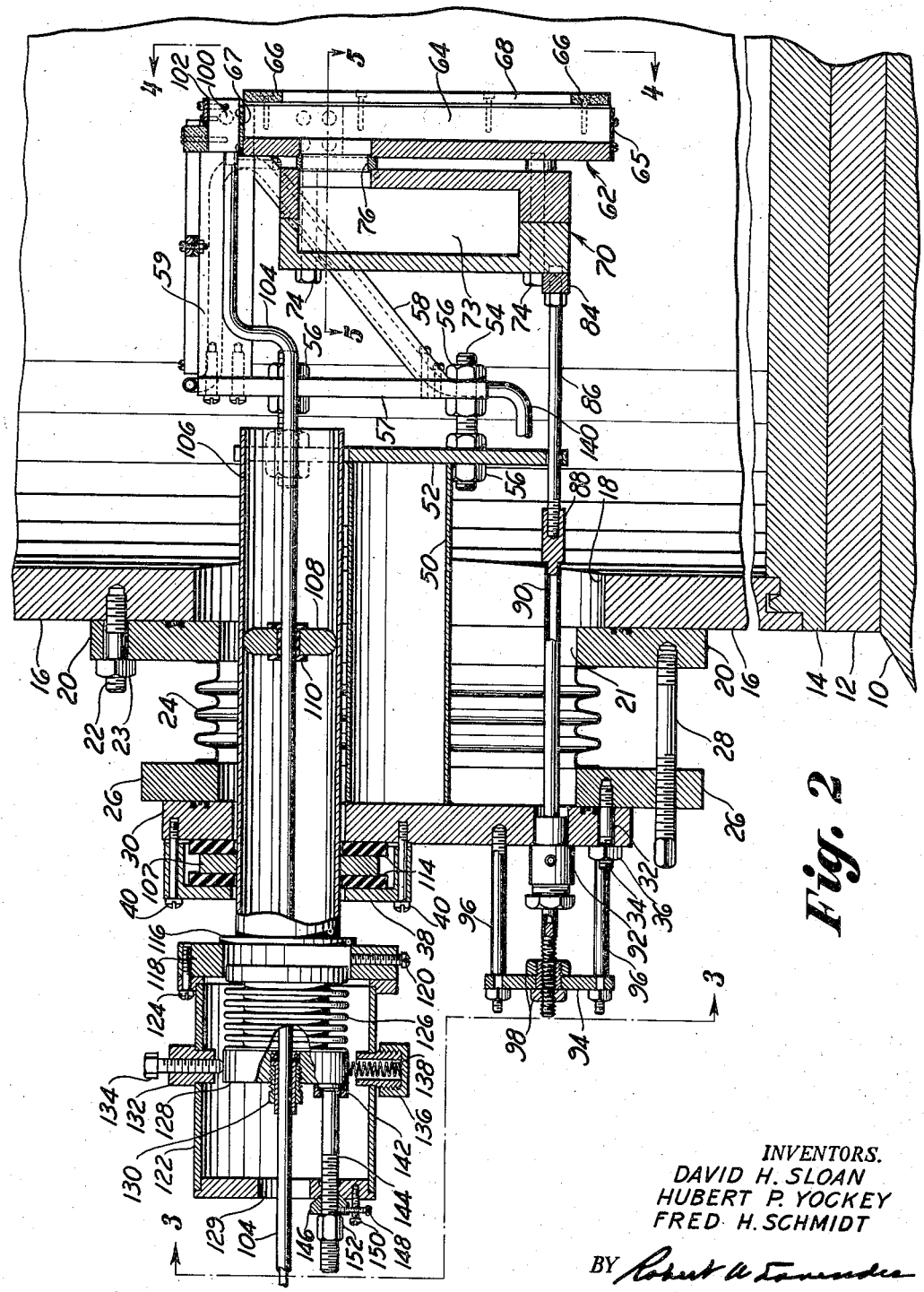

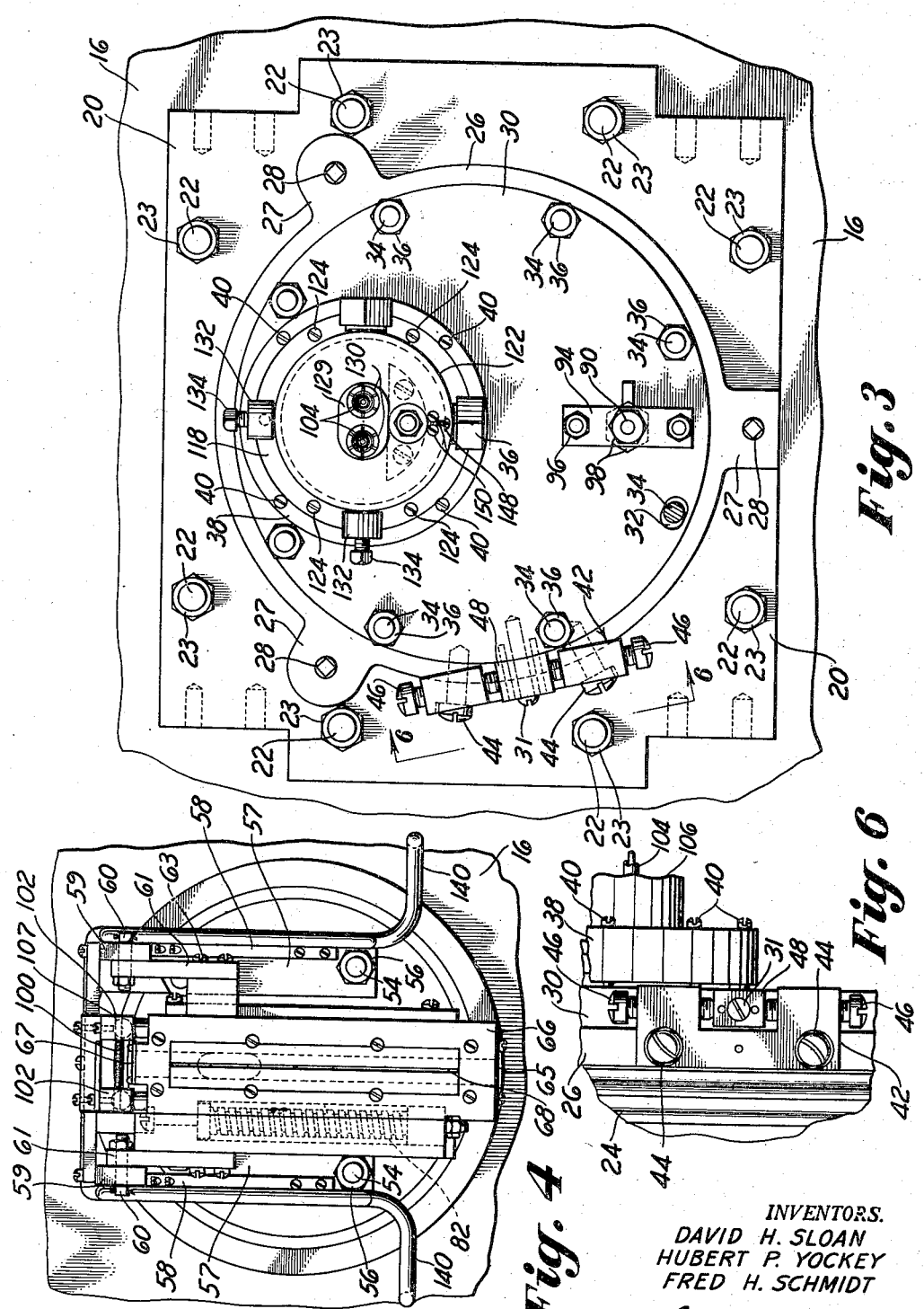

2,882,406

ION SOURCE UNIT FOR CALUTRON

David H. Sloan, Silver Spring, Md., Hubert P. Yockey, Oak Ridge, Tenn., and Fred H. Schmidt, Berkeley, Calif., assignors to the United States of America as represented by the United States Atomic Energy Commission Application May 14, 1946, Serial No. 669,478

6 Claims. (Cl. 250—41.9)

The present invention relates to the art of separating polyisotopic materials into constituent isotopes and more particularly to an ion source unit for a "calutron." A calutron comprises apparatus for vaporizing a charge of a polyisotopic substance, forming ions of the vaporized substance, and projecting the ions in the form of an intense beam through an evacuated vessel disposed in a powerful magnetic field. The flux causes the ion beam to follow a curved path, and ions of greater mass, that is to say ions of the heavier isotopes, tend to concentrate in the region of the beam adjacent the outer periphery of the curved path whereas ions of lighter isotopes tend to congregate along the inner periphery of the curve. By interposing in the path of the beam a collector having a plurality of spaced pockets, it is possible to collect separate aggregates in which the normal distribution of isotopes has been altered with the result that one of the aggregates has been enriched with respect to a given isotope and the other aggregate has been correspondingly impoverished with respect thereto.

The theory and operation of a calutron has been thoroughly disclosed and discussed in Letters Patent of the United States No. 2,709,222 issued May 24, 1955, to Ernest O. Lawrence. No useful purpose would be served by here repeating the discussion contained in said patent.

The mechanism used to form the ions of the polyisotopic material may conveniently include a block having a chamber for a charge of polyisotopic material, heaters for vaporizing the material, and arc chamber into which the vapor is introduced, means for establishing an arc discharge across the chamber, and an exit slit in one wall of the chamber disposed adjacent a pair of accelerating electrodes suspended slightly in advance of the slit. It has been the practice to render the accelerating electrodes highly negative with respect to the walls of the arc chamber in order to withdraw copious quantities of positive ions and to accelerate the withdrawn ions into an intense beam of relatively high velocity. It has been found that the disposition and adjustment of the elements comprising the ion source unit are highly critical and that the efficiency of the calutron and the yield obtained therefrom may be seriously affected if certain of the elements are not precisely adjusted with respect to each other.

The most important object of the invention is to improve the efficiency of a calutron.

Another object of the invention is to provide an ion source unit for a calutron wherein a larger percentage of the vapor is ionized than has heretofore been possible.

Still another object of the invention is to provide an ion source unit wherein the several elements are capable of universal and precise adjustment with respect to one another.

An important feature of the invention resides in an arc chamber capable of adjustment in two planes and cooperating with a filamentary cathode mounted for universal adjustment with respect to the arc block.

Another feature of the invention consists in the provision of means whereby the arc block and filament are not only capable of being adjusted with respect to each other but may also be adjusted simultaneously as a unit with respect to the vacuum envelope and the accelerating electrodes.

These and other objects and features of the invention will be more readily understood and appreciated from the following detailed description of a preferred embodiment thereof selected for purposes of illustration and shown in the accompanying drawings, in which:

Figure 1 is a plan view of an ion source unit embodying the invention,

Fig. 2 is a view in cross section along the line 2—2 of Fig. 1,

Fig. 3 is a view in end elevation of the face plate and associated mechanism,

Fig. 4 is a view in end elevation along the line 4—4 of Fig. 2,

Fig. 5 is a view in cross section along the line 5—5 of Fig. 2, and

Fig. 6 is a view in side elevation along the line 6—6 of Fig. 3.

It is to be understood that the drawings do not show the general organization of a calutron and that reference is made to the above-mentioned patent to Ernest O. Lawrence for such material. As shown in Fig. 2, a calutron is organized about an evacuated tank or envelope disposed between the poles of a powerful magnet. In Fig. 2, the lower pole 10 is shown fragmentarily and has superposed upon it a flat pole face 12 upon which rests the bottom of a tank or vessel of which the bottom wall 14 and an end wall 16 appear in the drawing. The upper pole piece and pole face and the remainder of the tank are not shown. In the end wall 16 of the vacuum vessel, there is a relatively large aperture 18, and a flat substantially rectangular plate 20 is secured to the end wall 16 by means of a plurality of studs 22 anchored in the end wall 16 and receiving nuts 23 by means of which the plate 20 may be drawn tightly against the outer face of the end wall 16. The plate 20 has an aperture 21 which substantially registers with the aperture 18 in the end wall 16. To the outer surface of the plate 20, there is welded a flexible metal expansible bellows 24 which in turn is welded at its outer end to an annular plate 26 provided with three radial ears or lugs 27 having tapped holes to receive three set screws 28 which also engage holes tapped in the plate 20. The threads on one end of each of the set screws 28 reverse in direction so that each screw has in effect a turnbuckle action. It will be apparent that by manipulating the set screws 28, the plate 26 may be canted with respect to the plate 20 and is accordingly capable of universal adjustment with respect thereto. The bellows 24 accommodates the adjusting movement and preserves the vacuum within the tank. A flat annular disk 30 is secured to the outer surface of the plate 26 by means of a plurality of radially disposed studs 34 anchored in the plate 26 and working in oversized slots or holes 32 cut in the disk 30. When the nuts 36 are loosened, the disk 30 may be rotated slightly with respect to the plate 26.

In order that the relative adjustment of the disk 30 and the plate 26 may be precisely controlled, there is provided mechanism including a bracket 42 secured to the plate 26 by means of a pair of screws 44 and having a pair of opposed upstanding ears with holes tapped for a pair of machine screws 46 which bear upon a block 48 secured to the periphery of the disk 30 by means of a screw 31. When the nuts 36 are loosened, the screws 46 may be manipulated to force the block 48 and thus the disk 30 to rotate with respect to the plate 26.

Welded to the inner surface of the disk 30 is an elongated hollow cylindrical stem 50 which supports at its inner end a flat plate or bracket 52. The plate 52 is apertured to receive a pair of threaded rods 54 each of which supports a vertical arm 57. The arms 57 are secured in adjusted position by means of a plurality of lock nuts 56 which clamp the threaded rods 54 to the plate 52 and to the arms 57. Each of the arms 57 supports an angularly disposed bracket 58 and a horizontal cross arm 59. The cross arms 59 are secured at their outer ends to the outer ends of the angular arms 58 and carry pivot pins 60 upon which are mounted a pair of plates 61 which in turn are secured to the side walls of an arc block 62 by means of a plurality of screws 63.

The arc block 62 is provided with a vertically elongated internal chamber 64 covered at the bottom by a plate 65 and at the top by a plate 67 having a small aperture therein. The front of the chamber 64 is covered by a face plate 66 in which has been milled a restricted exit slit 68. To the rear wall of the arc block 62 there is secured a vaporizing chamber block 70 having an internal chamber 73 adapted to receive a charge of material to be vaporized and covered on one side by a cap plate 78. The vaporizing chamber block 70 is secured to the arc block 62 by means of a plurality of bolts 74, and by a hollow bushing 76 interposed between the two blocks and cooperating with apertures whereby the vaporizing chamber 73 is placed in communication with the arc chamber 64. The vaporizing chamber block 70 is bored to receive a pair of electric resistance heating units 72 by means of which the material in the chamber 73 is heated and vaporized, and the arc block 62 is bored to receive a similar heater 82 in order that the temperature of the arc block 62 may be elevated to prevent the vapor flowing into the arc chamber 64 from condensing. To lend support and rigidity to the arms 58 and 59, there is provided a pair of crossed tie rods 80 secured to the inner and outer ends of the members 59.

It will be understood that the arc block and the vaporizing chamber block swing as a unit about the pivot pins 60 carried by the arms 59. A socket member 84 is secured to the rear wall of the vaporizing chamber block 70 near the bottom thereof and receives a rod 86 which terminates in a second socket member 88. The socket member 88 is carried on the end of a hollow stem 90 and fits somewhat loosely therein in order to provide for a certain amount of angular motion with respect thereto. The stem 90 extends through the apertures 18 and 21 and passes through a vacuum seal plug 92 secured in the disk 30. The end of the stem 90 is threaded and passes through a bracket 94 supported on the outer ends of a pair of rods 96 screwed into the disk 30. A pair of lock nuts 98 clamp the stem 90 to the bracket 94. When the lock nuts 98 are loosened, the stem 90 may be moved to determine the angular adjustment of the blocks 62 and 70 about the pivot pins 60, and when the desired adjustment has been secured, the lock nuts 98 are tightened to maintain the blocks in adjusted position. Overlying the aperture in the plate 67 above the arc chamber 64, there is a filamentary cathode 100 of tungsten or other suitable material in the form of a straight rod held at either end in a pair of clamping lugs 102 which are carried by a pair of stiff leads 104. The cathode leads 104 pass through a hollow cylindrical stem 106 which passes through the apertures 18 and 21 and contains a loosely fitting ceramic disk 108 provided with a pair of rubber insulating bushings 110 which support the leads 104. A centrally apertured cup-shaped housing 38 is secured to the outer surface of the disk 30 by means of a plurality of long machine screws 40. The stem 106 passes through the cup-shaped housing member 38 which contains a pair of rubber sealing rings 114 separated by a flange 107 formed integrally with the stem 106. The dimensions of the rubber rings 114 and the flange 107 are such that when the screws 40 are tightened, the rubber rings are compressed and form a vacuum seal about the stem 106. At its outer end the stem 106 terminates in a shouldered cap 116 to which is clamped a ring 118 held in place by a set screw 120 bearing on the cap 116. To the outer surface of the ring 118 is secured a cup-shaped member 122 having a terminal flange provided with holes receiving a plurality of screws 124 which serve to secure the member 122 to the ring 118. Welded to the outer end of the cap 116 is a flexible metal expansible bellows 126 which in turn is welded to an apertured plug 128 disposed within the cup-shaped member 122. The filament leads 104 pass through the cap 116, through vacuum seal plugs 130 disposed in the apertures in the plug 128, and through an aperture 129 in the outer end of the member 122. The member 122 is provided with a pair of plugs 132 having holes tapped therein for the reception of a pair of set screws 134 which bear upon the plug 128. The set screws 134 are disposed 90° apart and opposite each plug 132 is a socket 136 in which is disposed a helical compression spring 138. As the set screws 134 are manipulated against the spring tension exerted by the springs 138, the plug 128 is moved, thus causing the leads 104 to tilt with the disk 108 as an axis of rotation. By this means the filament 100 is adjusted with respect to the arc block 62. On the outer surface of the plug 128, there is a socket 142 which receives the end of a rod 144 and clamps it against the plug 128. The rod 144 is threaded and engages a hole tapped in the outer end of the cup-shaped member 122. A jam bushing 146 surrounds the rod 144 and bears against the outer surface of the end of the member 122 and is prevented from rotating by means of a screw 148 extending vertically down from the bushing 146 between a pair of screws 150 anchored in the end of the cup-shaped member 122. A pair of lock nuts 152 are provided for clamping the rod 144 in adjusted position. It will be evident that by reciprocating the rod 144, the plug 128 and thus the filament leads 104 are moved in and out with the result that the filament 100 may be adjusted horizontally with respect to the arc chamber 64.

As shown in Fig. 1, a conduit 140 is looped about the supporting mechanism for the blocks 62 and 70 and provides means whereby a cooling fluid may be used to reduce the temperatures of the elements after a run has been completed in order that the parts may be handled shortly thereafter.

It will now be evident that the stem 90 provides means for adjusting the angular disposition of the arc chamber and the exit slit with respect to the filament, the set screws 134 and the rod 144 provide means for universal adjustment of the filament 100 with respect to all other elements and that manipulation of the set screws 28 affords universal adjustment of the entire source unit with respect to the tank or vacuum vessel. Furthermore, manipulation of the set screws 46 provides means for rotation of the entire ion source unit. Consequently, it is possible to adjust all the important elements of the ion source mechanism in order that the calutron may be operated at highest efficiency. It is to be emphasized that the construction shown in the drawings and herein described represents but one preferred embodiment of the invention and that the scope thereof is not to be measured thereby but rather by the claims appended hereto.

Having now described and illustrated an embodiment of the invention, what we claim as new and desire to secure by Letters Patent of the United States is:

1. A calutron comprising walls forming a fluid-tight vessel, one of said walls having an aperture therein, a stem passing through said aperture, an ion source unit including a cathode and an arc block mounted on said stem within said vessel, said arc block being pivotally mounted upon said stem, and means for adjusting and fixing the angular disposition of said arc block with respect to said stem and said cathode.

2. A calutron comprising walls forming a fluid-tight vessel, one of said walls having an aperture therein, a stem passing through said aperture, an ion source unit mounted on said stem within said vessel and including an arc block having an arc chamber therein and a cathode disposed adjacent the end of said chamber, said arc block being pivotally mounted upon said stem, and means operable from the exterior of said vessel for adjusting and fixing the angular disposition of said arc block with respect to said cathode, whereby said cathode is aligned with said arc chamber.

3. A calutron comprising a vacuum envelope having a wall with an aperture therein, a stem passing through said aperture, means secured to said wall adjacent said aperture for mounting said stem for universal movement with respect to said envelope, an ion source unit secured to the inner end of said stem within said envelope, said ion source unit comprising a cathode and an arc block having an elongated arc chamber open at the top thereof and adapted to encompass an arc discharge from said cathode to the bottom of said chamber, said arc block being pivotally mounted substantially at the top of said arc chamber, and push rod means contacting said arc block at a distance from said pivotal mounting thereof and aligned perpendicular thereto, said push rod means extending through the aperture in said envelope and being adapted for longitudinal movement whereby said arc block is pivoted to align said arc chamber with said cathode.

4. A calutron comprising a vacuum envelope having having an apertured wall, means establishing a magnetic field through said envelope, a hollow stem mounted in the aperture of said wall in vacuum-tight relation thereto, an ion source unit secured to said stem within said envelope, said ion source unit including a cathode and a pivotally mounted arc block having an arc chamber adapted to be aligned with said cathode and said magnetic field, and an adjusting rod secured to said arc block and extending through said hollow stem for pivoting said arc block whereby said cathode and arc chamber are aligned in said magnetic field.

5. A calutron comprising a vacuum envelope having an apertured wall, means establishing a magnetic field through said envelope, a first stem passing through said aperture, an arc block pivotally mounted on said first stem within said envelope, means operable from the exterior of said envelope for varying the disposition of said arc block relative to said first stem, a cathode, a second stem supporting said cathode adjacent said arc block, means for universal adjustment of said cathode independently of said arc block, and means for effecting simultaneous universal movement of said first and second stems.

6. A calutron comprising a vacuum envelope having a wall with an aperture therein, a mounting stem passing through said aperture, a flexible coupling for sealing said stem to said wall, adjusting means connecting said stem and said wall for providing universal movement of said stem with respect to said wall, an ion source secured to said mounting stem within said vacuum envelope, said ion source comprising an arc block having an elongated arc chamber therein and a cathode disposed adjacent the end of said arc chamber and exterior thereto, a mounting tube extending through the wall of said vacuum envelope internal to said flexible coupling and secured to the outer end thereof, a pair of rigid cathode leads secured to said cathode and extending through said mounting tube, a supporting element surrounding and secured to said cathode leads and bearing upon the interior circumference of said mounting tube substantially in a line of contact, an adjusting plate flexibly coupled to said mounting tube and pierced by said cathode leads, spring loaded adjusting screw means engaging said adjusting plate in compression relation thereto whereby adjustment thereof pivots said cathode leads about said bearing element and varies the disposition of said cathode relative to said arc chamber, and longitudinal adjusting means including a threaded stud bearing upon said adjusting plate for moving said cathode leads longitudinally whereby the disposition of said cathode is further varied with respect to said arc chamber.

References Cited in the file of this patent

UNITED STATES PATENTS

| | | |
|---|---|---|
| 1,993,724 | Gebhard | Mar. 5, 1935 |
| 2,167,519 | Manthorne | July 25, 1939 |
| 2,221,467 | Bleakney | Nov. 12, 1940 |
| 2,440,067 | Benson | Apr. 20, 1948 |

OTHER REFERENCES

Lawrence et al.: Physical Review, Dec. 15, 1936, vol. 50, pp. 1131–1140.

Straus: Physical Review, Mar. 1, 1941, vol. 59, pp. 430–433.